May 28, 1935.  G. T. SOUTHGATE  2,003,057
ARC WELDING POWER UNIT
Filed Nov. 30, 1931   5 Sheets-Sheet 1

INVENTOR:
George T. Southgate,
BY Byrnes Townsend & Potter,
ATTORNEYS.

May 28, 1935.   G. T. SOUTHGATE   2,003,057
ARC WELDING POWER UNIT
Filed Nov. 30, 1931   5 Sheets-Sheet 2
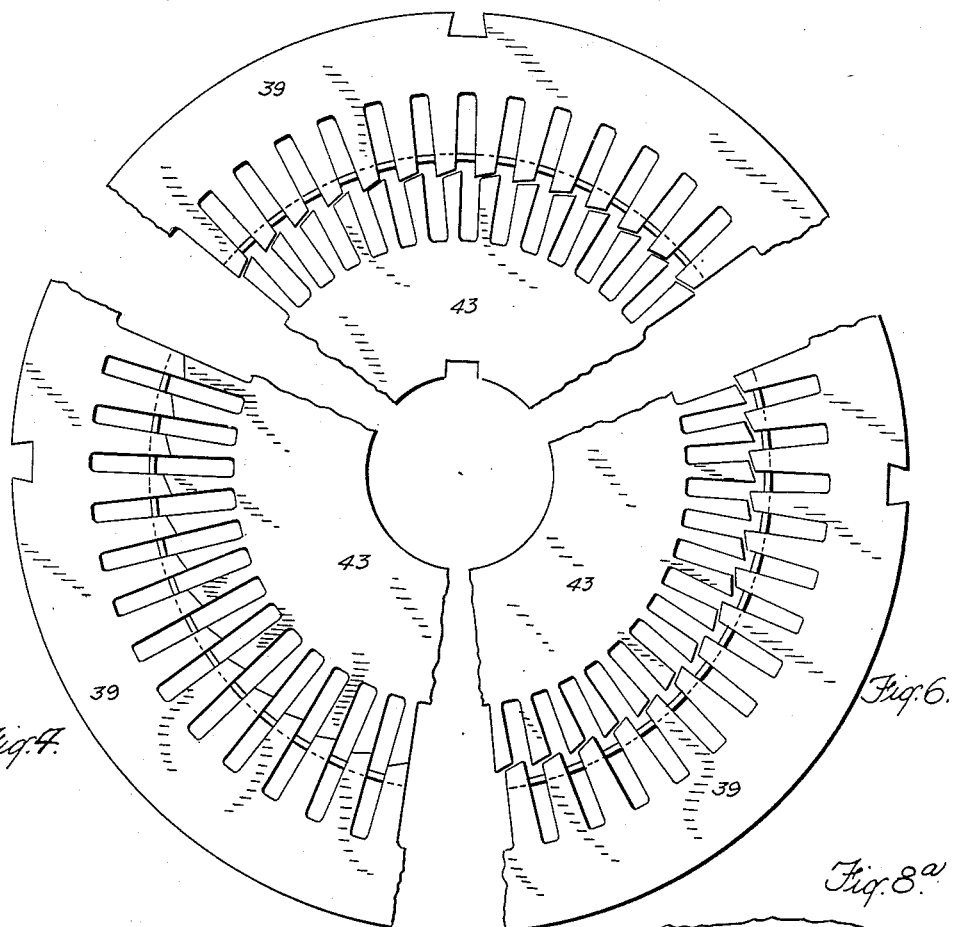
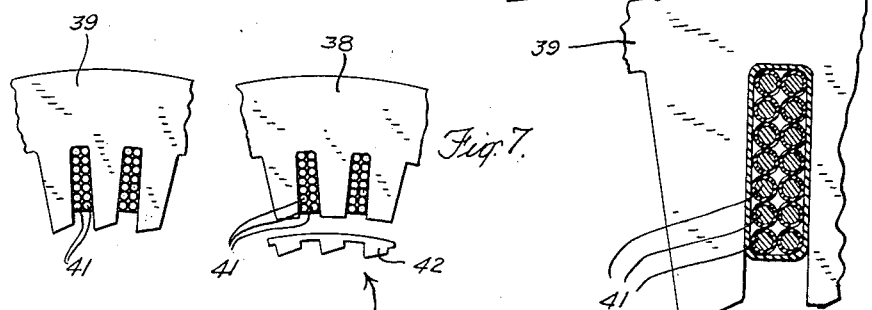
INVENTOR:
George T. Southgate,
BY Byrnes, Townsend & Potter,
ATTORNEYS.

May 28, 1935.  G. T. SOUTHGATE  2,003,057

ARC WELDING POWER UNIT

Filed Nov. 30, 1931  5 Sheets-Sheet 3

INVENTOR:
George T. Southgate,
BY Byrnes, Townsend & Potter,
ATTORNEYS.

May 28, 1935. G. T. SOUTHGATE 2,003,057
ARC WELDING POWER UNIT
Filed Nov. 30, 1931 5 Sheets-Sheet 4

INVENTOR:
George T. Southgate,
BY Byrnes Townsend & Potter,
ATTORNEYS.

May 28, 1935.  G. T. SOUTHGATE  2,003,057
ARC WELDING POWER UNIT
Filed Nov. 30, 1931   5 Sheets-Sheet 5

INVENTOR:
George T. Southgate,
BY Byrnes, Townsend & Potter,
ATTORNEYS.

Patented May 28, 1935

2,003,057

UNITED STATES PATENT OFFICE 2,003,057

ARC-WELDING POWER UNIT

George T. Southgate, Forest Hills, N. Y., assignor to Union Carbide and Carbon Research Laboratories, Inc., a corporation of New York Application November 30, 1931, Serial No. 578,137

8 Claims. (Cl. 171—123)

This invention relates to an electric system for arc welding. More specifically, it relates to a power unit of the class of a synchronous converter which receives power in a stationary, polyphase, primary winding, and which from a stationary secondary winding and its commutative system delivers direct current of suitable and adjustable voltage characteristics for arc welding. Through phase shifting of the revolving brushes, and further by means of superinduced and adjustable reactance, the output voltage of the machine can within its range be given any desired initial value at zero load, and any rate of droop under ampere loading up to short-circuit.

The objects of the invention include provision of a power machine of minimum size and weight for a given capacity, elimination of the rotating armatures of a motor-generator or rotary converter, improvement of the stationary commutator with respect to insulation and ventilation, regulation of the general level of output voltage by brush-phase setting, enhancement of flexibility of output voltage regulation through exploitation of a peculiar oblique construction of the tooth-ends in the laminated magnetic cores, improvement of mounting for the brush-driving auxiliary motor, minimizing of the manufacturing cost of the complete power unit and provision of an electric system having peculiar characteristics valuable in arc welding.

These and other objects of my invention will be evident from the following specification having reference to the accompanying drawings, in which:

Fig. 4 is a plan view of a portion of the core of the primary and secondary in position for maximum permeance of mutual flux path;

Fig. 5 is a similar view of the core in an intermediate position;

Fig. 6 is a view of the core in the position in which there is maximum flux leakage;

Figure 11:
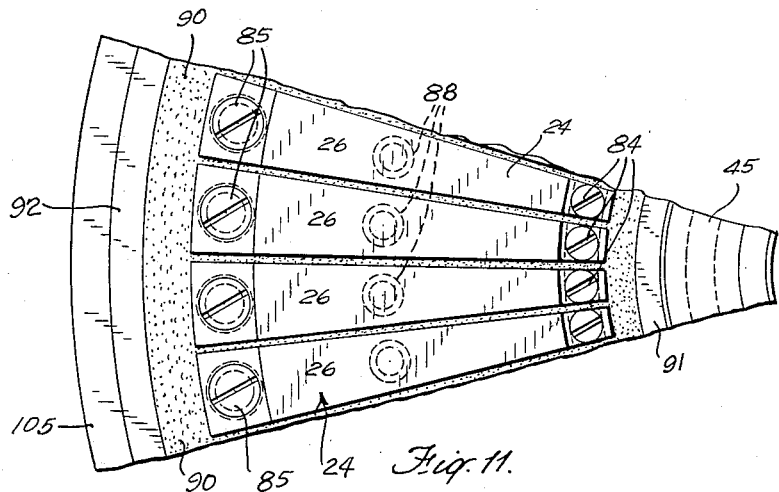
Figure 10:
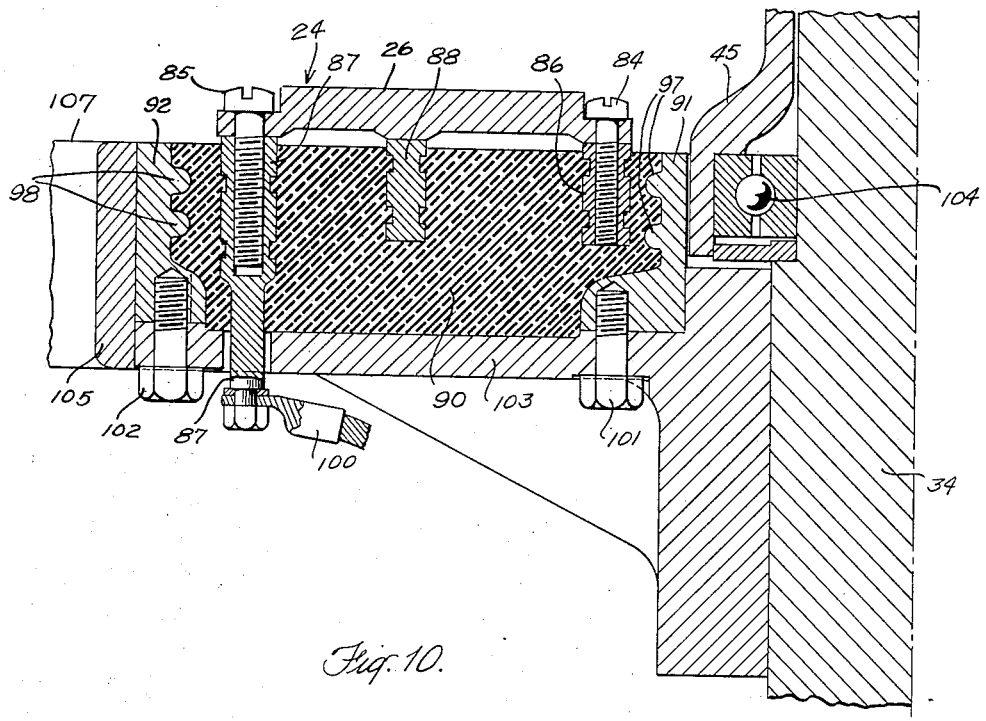
Figure 12:
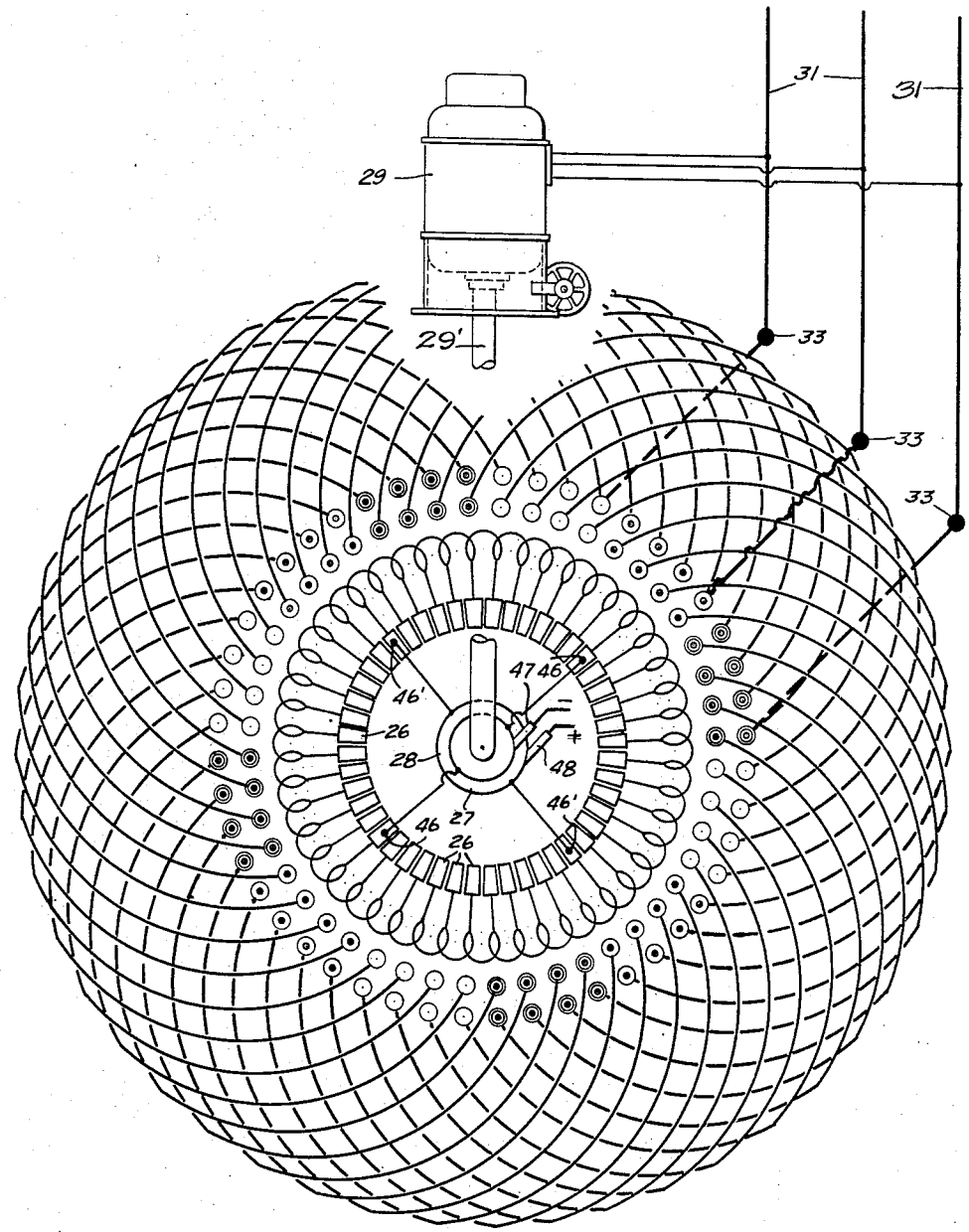
Figure 13:
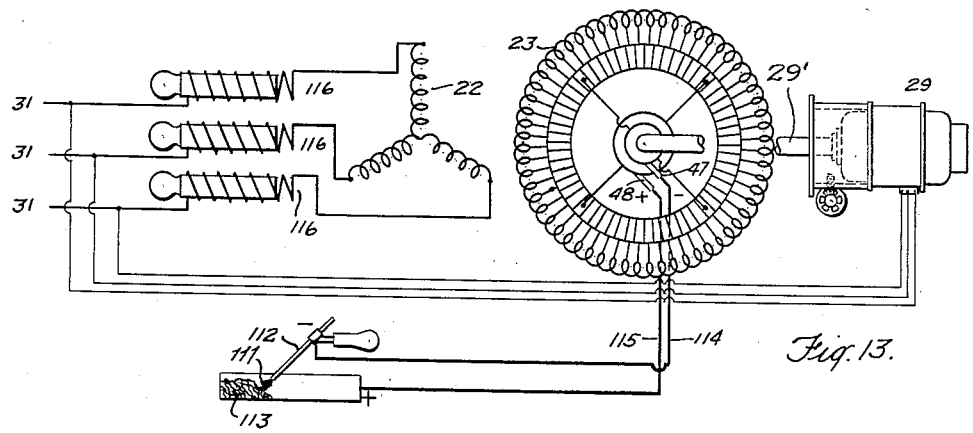
Figure 14:
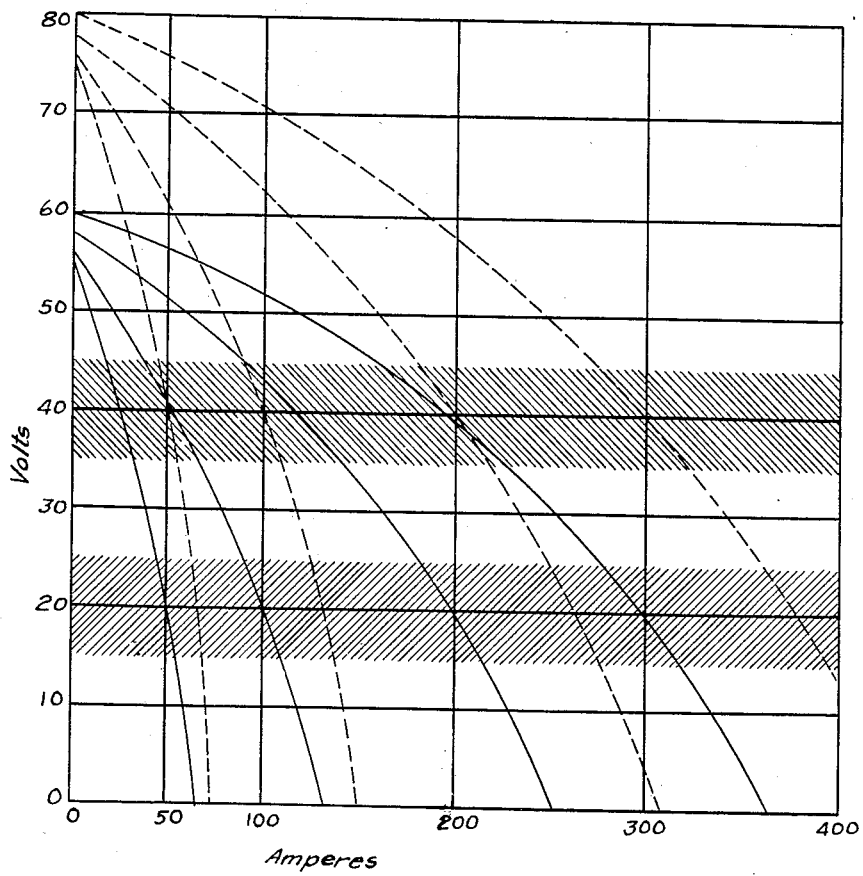

Figs. 7, 8, and 9 are sectional views of portions of the core elements of the primary;

Fig. 8a is an enlarged section similar to Fig. 8 showing the winding in greater detail;

Fig. 10 is a left-half vertical midsection of the stationary commutator and its supports;

Fig. 11 is a part-plan of the commutator and its supports;

Fig. 12 is a general wiring diagram of the power unit;

Fig. 13 is an additional wiring diagram illustrating in general a complete arc-welding system according to my invention, and in detail relative thereto, inductance superinduced within or separately series-connected before the primary winding; and Fig. 14 is a set of curves of the output voltages and currents obtainable from the power unit.

The embodiment illustrated in the drawings, particularly Figs. 1, 2, 10 and 11, includes a polyphase transformer 21 having a primary winding 22. A secondary winding 23 is arranged in inductive relation to the primary winding and is connected, in the manner usual for direct-current armatures, to the stationary commutator 24. The rotating brush system 25 coacts with the sectors 26, of which the stationary commutator 24 is comprised, and through its parts suitably arranged, carries direct current received from the commutator to rotating slip rings 27 and 28. The rotating brush system 25 is driven by a synchronous motor 29, the input of which is supplied from the polyphase mains 31 to which the power-unit primary winding 22 is connected. As shown in this embodiment, the entire machine is preferably built upon a vertical axis; and the synchronous motor 29 is therefore mounted atop the power unit proper. A motor base 32 forms the structural connection between the housing of the power unit proper and that of the auxiliary motor.

The transformer 21 is in general similar to a three-phase or other polyphase induction motor with the addition of arrangements, more fully hereinafter described, for adjustably superinducing primary flux leakage. The primary winding 22 is preferably mounted in the stator and the secondary winding 23 in the rotor of this machine, while the stationary commutator is mounted in rigid relation to the rotor and its secondary winding. Current from the line 31 is supplied to the primary through the terminals 33. Inasmuch as the secondary winding on the rotor receives its energy entirely by induction, no slip rings are required for the rotor winding.

The rotor is mounted upon the shaft 34, which is held against rotation and made adjustable in angular position by means of a worm-wheel 35 and a worm 36. For this adjustment, the thread pitch of the worm-and-wheel gear should preferably be rather small. The stator core 37 is supported within a casing 19 which in turn is mounted on the ends of the upwardly extending members 20 of a base plate 20a, which is adapted to be moved on rollers 20b.

The stator core 37 and the rotor core 40 are built of laminations of transformer steel or alloy. As shown in Figs. 4 and 9 inclusive, their construction is modified in two essentials for the purpose of superinducing and regulating in amount the leakage of magnetic flux from tooth to tooth of the primary (stator) structure, in distinction from the passage of flux mutually through the primary and secondary cores. Referring to Figs. 7 and 8, the first essential in which the stator laminations are modified consists in that alternate sheets 38 and 39 are provided, in which the teeth of the former extend radially toward the rotor a shorter distance than those of the sheets 39. These sheets are stacked in alternate relation and the coils 41 are then inserted or wound in the slots between the teeth. After the windings are placed and insulated, lamination rings 42, of the peculiar, toothed form shown in Fig. 9, are inserted between the protruding teeth of adjacent laminations 39; the rings fitting onto the ends of laminations 38 in suchwise that the teeth of the rings align with the inner ends of the teeth of laminations 39. For convenience in assembling, the rings 42 may be divided into two, three or more circumferential sections.

When the laminations are thus assembled and clamped, the rings 42 not only serve to hold the winding in place, but also provide a path for flux leakage from one part to another in the primary structure. The cross section of this leakage path is designed to give an amount of permeance from tooth to tooth and pole to pole across the working face of the stator, such that a strongly drooping characteristic of voltage with increasing current is imparted to the output of the machine.

Regulation of the amount of this voltage droop is effected by the additional modification of the laminations in both stator and rotor, likewise shown in Figs. 4 and 9 inclusive. Referring to the first three of these figures in grouped arrangement, it will be observed in Fig. 4 that the stampings 39 of the stator, and 43 of the rotor, may be made from the same sheets. The blank sheets are first stamped with their inner and outer circles, keyways, etc., and with coil slots common to both stator and rotor, the teeth still being mutually joined. These stampings are then sheared apart by bias cuts across all of the teeth so that after this severance the inner and outer sheets are in the relation illustrated by Fig. 4, with the outer stampings 39 having the same number of teeth as the rotor stampings 43. The other stampings 38 of the stator may be originally integral not only with the rotor stampings 43, but also with the leakage rings 42.

When the assembled rotor and stator cores are adjusted in the position shown in Fig. 4, the permeance of the mutual flux path is at a maximum, and the leakage through the flux-shunt rings 42 is at a minimum, inasmuch as the reluctance of the shunt path does not substantially vary. When the rotor, by suitable means, is angularly shifted to the position shown in Fig. 5, the reluctance of the mutual flux path is substantially increased and leakage through the shunt path is therefore enlarged. When the rotor is shifted to the position shown in Fig. 6, the leakage of flux is increased to approximately its maximum amount, due to the lengthening and narrowing of the effective air gap from the teeth of the stator to those of the rotor. In this manner the rate of droop of output voltage with power loading is increased considerably; this adjustment being analogous in its effect to the adjustment of a variable reactance inserted in series with the primary of the machine. As hereinafter set forth by reference to the curves, the operator is thus enabled to set the machine at any desired voltage droop with various magnitudes of ampere loads, as for example in changing from welding heavy plate to the welding of thinner sheet metal.

Figure 3:
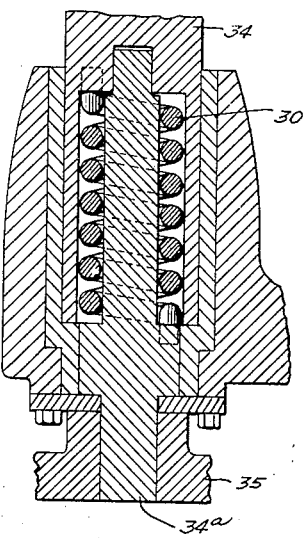
Fig. 3 is a vertical mid-section of a modified form of the lower bearing and worm-wheel arrangement of the transformer, including a resilient device hereinafter explained.

The rate of output-voltage droop adjustable by the foregoing means may be further modified by the mechanically resilient device illustrated in Fig. 3 in which there are inserted between the worm-wheel 35 and the hollow lower end of the angularly adjustable shaft 34 a torsional spring 30 and a spring-shaft 34a, against which is exerted the motor-wise torque of the rotor of the transformer. Obviously, 34a instead of 34 could be hollow-ended and their relative radial positions thus reversed. The motor-wise torque is resisted by the worm-wheel 35, which in turn is positioned and locked by the worm 36, as in the non-resilient construction already described.

In this resilient modification the motor-wise torque of the polyphase transformer is directed to cause the air gap between the oblique-ended teeth of the primary and secondary cores to be increased by any increase of the load current. In Figs. 4, 5 and 6, the direction of the motor-wise torque should be clock-wise. Its magnitude must be sufficient to overcome the mutual-flux attraction between the ends of the core teeth, or conversely, the teeth must not be initially close enough together to cause the moment of the mutual-flux attraction to be greater than the motor-wise torque. It will be seen that in this arrangement any increase in the load current will set in operation an action opposed to such increase, in that such increase causes resilient radial lengthening and circumferential narrowing of the mutual-flux air gap, with consequent enlargement of the primary-flux leakage. Thus, the voltage tends to become even more drooping and the current even more nearly constant than they would be without the resilient arrangement.

The polyphase current supplied to the primary winding produces a rotating polarity of the primary field which in turn induces within the secondary winding polar zones of electromotive force from which direct current can be taken by commutation in the same manner as in the operation of an ordinary direct current armature, provided in this case the commutator is stationary and the brushes are rotated at synchronous speed. Reverting to Figs. 1 and 2, the commutating mechanism in the present invention therefore comprises the insulated commutator bars or sectors 26 and a rotating brush system 25, which in cooperation with the delivery rings 27 and 28 deliver the output current to stationary line brushes 47 and 48. Proper rotation of the brush system 25 is imparted by the synchronous motor 29, supplied with polyphase current from the same mains that supply current to the transformer primary 22.

The rotating brush system 25 comprises a spoked plate 44 having a sleeve or quill 45 fitted on an extension of a transformer shaft 34. Mounted on plate 44, but insulated therefrom, are pairs of brush structures 46—46 and 46'—46'. These two pairs are of the same construction but are so designated in that the pair 46—46, spaced 90° from the other pair 46'—46', serves to collect positive current, while the latter collects negative current from the commutator. One pair of brush structures, as 46—46, is connected to delivery ring 27 and the other pair 46'—46' to ring 28, from which the respective line brushes 47 and 48 take off line current to the load.

The rotating brush system 25 is surrounded by a shell 49 for conserving the ventilating air and for assuring safety to the operator. The shell 49 is secured by cap screws 49' to the upper end of the transformer casing 19. For delivering air through the commutator system and the transformer structure, the brush-structures ordinarily have ample blowing capacity alone, but in some cases they may be supplemented with radial or curved vanes, not shown in the drawings. Proper directing of the air to the brush-structures at their radially inner portions, and prevention of short-circuit of the air from the radially outward portions back to the origin, is effected by means of the thin, flat, centrally open, circular disc 49a of electrically insulating material affixed to the brush structures. The complete path of the ventilating air is inward through openings 32' in the motor base 32, downward through the central hole 49b in the disc 49a, outward along the blower acting brush structures, downward within the closed transformer housing through and around the windings and cores, and out to the atmosphere at the open bottom of the power unit.

Provision can readily be made for preventing the air from carrying copper and carbon dust into the winding, as by means of centrifugal separating arrangements, not shown, in the path of the air. The main path may include a sharp angle into the transformer structure; while a portion of the brush-discharged air can be allowed to vent directly through openings 32" in the side of the housing, carrying the dust therewith and giving increased cooling of the commutator and brushes because of its added volume in a local circuit.

The main-brush-structures of this invention are not shown in great detail on the drawings, inasmuch as any suitable type may be employed. However, in the example illustrated the brushes 54 are urged toward the commutator by adjustable spring-actuated members 72. Friction between the brushes and their holders 53 is minimized by means of suitable rollers 74, against which bears a face plate 75 on the brush 54, which is thrown outward by a large centrifugal force, due to the rotation of the brush structure. The rollers bear in turn against a smooth, hard plate 76 mounted in the brush holder.

Figure 1:
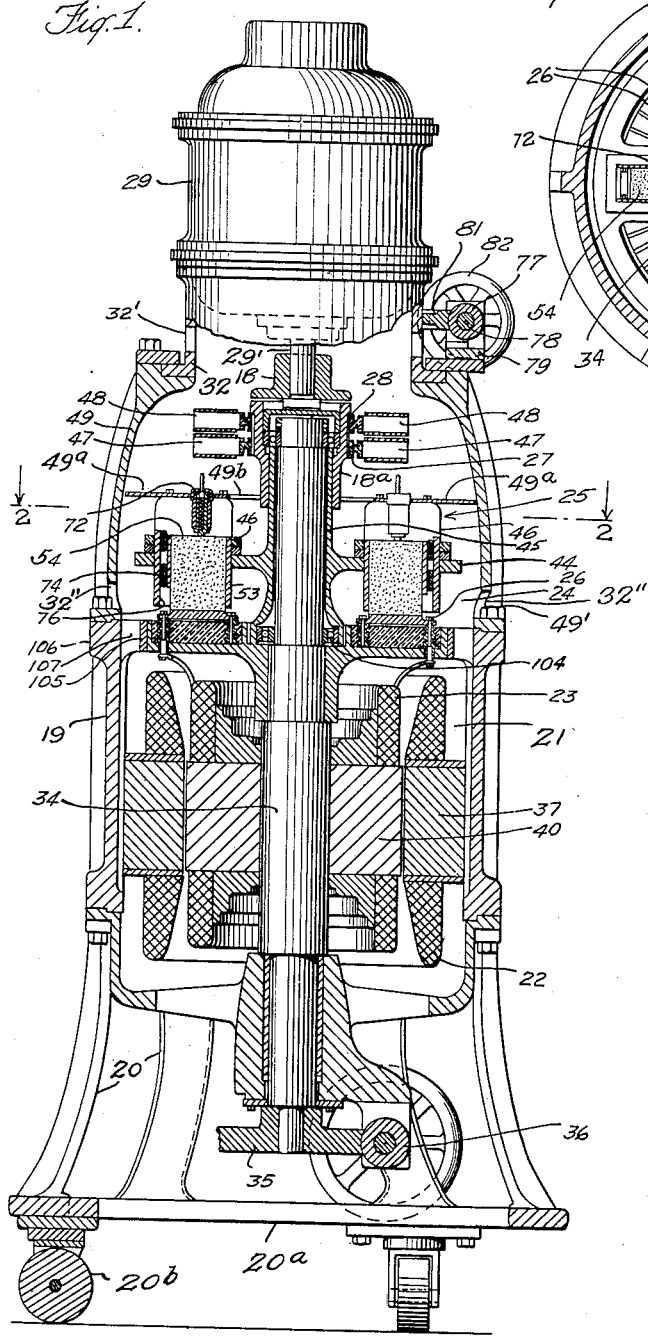
Fig. 1 is a sectional elevation of a power unit constructed in accordance with one embodiment of my invention.

In the wiring diagram, Fig. 12, the commutating brushes 46—46 and 46'—46' are shown merely as dots on the ends of radial lines, which represent the connection to and support for these brushes. It will be seen that in this four-pole machine two of the brushes are connected with slip ring 27 and the other two with slip ring 28, while line brushes 47 and 48 bear upon these rings and serve as the output terminals of the power unit. The armature or secondary of the transformer is represented conventionally as a Gramme ring winding, with its tap points connected to the commutator bars 26; and the primary winding is drawn in a conventional way for a three-phase, four-pole construction. It will be seen that the three-phase supply for the brush-driving synchronous motor 29 is from the same mains 31 that serve the primary of the transformer. The motor shaft 29' is coaxial with, but not coupled to the shaft 34 of the rotor of the transformer. As shown in Fig. 1, a coupling 18 having a removable sleeve part 18a is fastened to the end of the motor shaft 29'. The slip rings 27 and 28 are secured to the sleeve 18a, which fits over and is rigidly connected to the quill 45 of the plate 44 that carries the brushes 54. With this construction the slip rings 27 and 28 and the brushes 54 are driven by the motor 29, while the transformer shaft 34 and rotor structure supported thereby do not rotate but are adjustable in an angular position. This arrangement of coupling of the motor shaft 29a to the brush system is diagrammatically indicated in the wiring diagram in Fig. 13 by extending the motor shaft to the center of the commutator and brush system.

Figure 2:
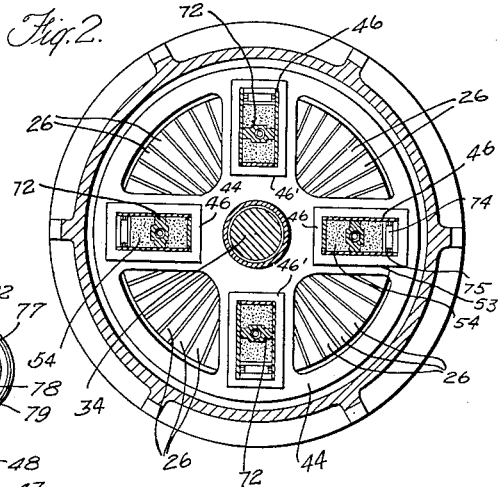
Fig. 2 is a plan section in the plane 2—2 of Fig. 1.

The stationary commutator 24, shown assembled in the machine in Figs. 1 and 2 and in further detail in Figs. 10 and 11, comprises the copper bars 26 of flat sectoral form, fastened by means of screws 84 and 85 to the metal inserts 83 and 87. The insert 87 is preferably made of a well conducting cuprous bronze, and is extended at its lower end into a threaded stud, to which is fastened by nuts the terminal 100 of the wire leading from the proper tap-point in the armature or secondary winding 23. These inserts are molded in a hard setting plastic electric insulation 90, and are themselves internally threaded for the reception of the aforementioned screws. In addition, a third insert 88 is buried in the molded insulation under approximately the midpoint of each commutator bar. In fabrication the inserts are preferably fitted into accurately spaced and sized holes in the bottom of a metal mold and there held while the insulating plate is being cast. All of the inserts serve to space the elevation of the commutator bars above the insulation, and the inner and outer ones serve also to fasten down the bars firmly and accurately. It will be understood that the mutually abutting faces of the commutator bars and insers are accurately machined, those of the latter preferably after the molding. The inner and outer metal rings 91 and 92 are also molded with the insulating material and in fact serve as the lateral forms in the casting of the insulation, being, of course, accurately fitted to the mold plate above-mentioned.

The material which I have found most suitable for the molded insulation is hydraulic cement mixed water-damp with sand or other small aggregate, suitably cast, then dried out at a little above the boiling temperature of water, then impregnated with a dissolved form of preferably a phenolic resin or other material capable of becoming polymerized or otherwise hardened and fixed, and finally heated to effect such fixation of the impregnating material. More specifically, I have employed high alumina cement as the hydraulically setting agent in the main structure and the phenolic resin varnish known as Bakelite varnish as the impregnating material, and have baked out the cast structure after such impregnation. The principles and advantages of this combination are that the high-alumina cement body attains its strength very quickly, that its strength, rigidity and impact resistance are excellent for the structural requirements, and that the impregnation with a phenolic condensation product protects the cement structure against humidity and resultant volume change, increases the electric insulating property, and improves the strength and impact resistance. In effect the resin fixed within the interstices of the slightly porous cement structure becomes a structural skeleton within another skeleton.

It will be seen that the commutator bars 26 are shouldered where they rest upon the inserts and recessed between the inserts, and that the bars are separated from each other by air spaces. This separation of the bars from each other and from the molded insulation provides access for thorough circulation of air, with consequent cooling of the commutator by ventilation incidental to the previously described ventilation of the brushes and other parts of the machine. This device for cooling the commutator is unique in my invention and has proven to be valuable.

The cement-coping metal rings 91 and 92 are provided with a number of inwardly extending ridges 97 and 98, are machined on their lower faces and are tapped for fastening screws 101 and 102. The commutator structure is, by means of these faces and machine screws, fastened to the metal spider 103, which in turn is accurately fitted to and rigidly fastened upon the shaft 34. In Fig. 10 there is also shown a ball bearing 104 which coacts with the hollow spindle in supporting the rotary brush system 25. The outer surface of the ring 92 is smoothly machined and slidably fitted to the machined inner surface of a rim 105 forming an integral part of the inner, upper end of the central section 106 of the main housing of the power unit. As shown in Fig. 1, this rim 105 is integrally cast with the housing section 106 through the connecting webs 107, and the air discharged from the rotary brush system, or a portion thereof is delivered to the transformer portion of the power unit through the spaces between the said webs.

As previously stated, there are two essentials of regulation of the output voltage of this power unit and two means for their effectuation, either of which may be regulated independently or in cooperation with the other. The means of varying the rate of droop of voltage with increase of load, and the mode of its adjustment have already been described herein, and the means of adjusting the power unit to give any desired initial and general level of output voltage will now be described. By "level of voltage" is meant its value at secondary open circuit and in the neighborhood thereof, whatever may be the rate of droop of the voltage with increasing load. This setting of the general level of output voltage gives the operator a choice between the best conditions for various classes of welding, or more specifically and usually, between welding with a metallic electrode or with a carbon electrode. In general, carbon or graphite-electrode welding requires substantially higher voltage for stable and advantageous performance than does metallic-electrode welding.

Regulation of the above defined level of output voltage may be effected in my invention by either or both of two methods. The first consists in switching by ordinary means the internal connections of the transformer primary winding from Y to delta and vice versa. With given three-phase power supply mains a lower direct current voltage may be delivered from the power unit if its primary winding is connected in Y, and a higher output voltage if its primary is connected in delta. This interchange gives a large step of output voltage modification. In practice the design of the transformer structure should and economically can be such that the magnetic cores are not oversaturated with the delta connection.

The other means of adjusting the general level of output voltage is a device for shifting the angular relation between the motor rotor and its driven brush system on the one hand, and the intangibly rotating transformer field on the other hand. This is readily and simply built, particularly in a vertical power unit, as a worm-and-wheel arrangement for moving the stator of the motor. The parts are shown in Fig. 1, with a worm 77 secured to a shaft 78 which is supported by a bracket bearing 79 attached to the upper end of the main housing of the power unit. The segment of a worm wheel 81 is affixed to the motor base 32, and a hand wheel 82 is secured on an extension of the shaft 78.

Fig. 13 shows diagrammatically one form of my invention comprising an arc-welding system in which my improved power unit forms a part. It includes in circuit combination the said power unit, a pair of service wires, a welding tool, an electrode, the welding arc, and the body being welded; and the primary circuit of the power unit includes adjustable inductance either superinduced by flux leakage within the transformer structure or inserted as separate bodies in the supply leads thereto. The arc 111 plays between electrode 112 and the work-body 113, which are connected to the power unit's output terminal brushes 47 and 48 by means of the wires 114 and 115. Each conventionally shown means 116 either represents adjustable inductance superinduced within the winding itself, as hereinbefore described with reference to Figs. 1, 2 and 4 to 9 inclusive, or an ordinary iron-cored inductor, preferably adjustable in inductance value inserted externally of the winding in series with the primary supply leads 31; or it may represent a combination of these two arrangements. Such combination is sometimes desired where sufficient or sufficiently adjustable inductance cannot conveniently be superinduced within the primary structure and wherefore it may be supplemented by external reactance in the primary leads.

In Fig. 14 there are shown a number of curves divided in two families, corresponding to two general levels of output voltage. One family is drawn in solid lines and the other in broken lines; and each family comprises a number of curves of differing voltage droop. As previously explained, the rate of droop of a given curve is adjusted by means of the worm-and-wheel arrangement that shifts the angular position of the bias-cut teeth of the primary and transformer secondary cores in relation to each other. In distinction from the rate of droop, the general height of the family of curves is adjusted by means of the worm-and-wheel arrangement on the mounting of the synchronous motor, or alternatively in one step by switching the connection of the transformer primary winding from delta to Y or from Y to delta. Thus, by altering both the rate of droop and the general voltage level, the operator can set his machine suitably for operation in light sheet-metal welding with a metallic electrode or in heavy plate welding with a graphite electrode, or for other desired combinations and uses.

Relative to both Fig. 13 and Fig. 14: from my invention consisting of external inductors in the primary leads combined with the polyphase transformer, the commutating system and the load, there is derived a drooping of output voltage similar to that shown by the curves. It is additional to and cooperative with the drooping-voltage regulation accomplished by the means already described; and it results from the shifting of time-phase of the current through and of the voltage beyond the external inductors, with reference to the supply voltage before the inductors wherefrom the brush-driving synchronous motor is excited.

For exploiting this additional voltage droop it is desirable that, by means of the described worm-wheel adjustment of the synchronous motor's stator, the revolving brushes be brought approximately into phase with the maximum secondary voltage of the transformer at no output, or in the direction of brush rotation, beyond that position of maximum output voltage. It will be observed in Fig. 13 that the synchronous motor takes its excitation from the power-incoming side of the inductors.

When the transformer is now loaded in its arc-welding function, the motor's time phase of brush driving remains unaltered, while the excitation voltage and power current into the transformer primary lag in amount varying directly with the load. Thus the voltage of the direct current collected at the commutator is made to droop with increasing load, in amount additional to the droop effected by the other means described. The rate of this added droop, as well as the level of no-load output voltage, may be adjusted by variation of amount of inductance in the primary polyphase circuit.

It will be understood that while the parts of my improved invention have been described in considerable detail, many and substantial variations could be made in their design and construction, within the scope of my invention as defined by the claims.

I claim:

1. In a device for supplying direct current for arc welding, the combination of a polyphase primary winding having a core and adapted to receive alternating current from a source of supply to produce a rotating magnetic field, a secondary winding having a core and arranged in inductive relation to said primary winding, said cores being angularly movable relative to each other and so constructed that the leakage flux produced in the core of said primary winding is varied during such angular movement, a commutating device including a rotatable part and a part fixed relatively to said secondary winding and electrically connected thereto, a motor having a rotor connected to the rotatable part of said commutating device for driving the same, means for supplying current to said motor from the source of current supply of the primary winding, means for causing a relative angular movement between said secondary winding and the fixed part of the commutating device and said primary winding, and independent means for varying the phase relation between the rotating magnetic field produced in said primary winding and said motor rotor and the rotatable part of the commutating device connected thereto.

2. In a device for supplying direct current having a drooping voltage characteristic, the combination of a primary field structure and a secondary field structure, said field structures including cores having teeth with oblique ends, means for moving one of said field structures relatively to the other to vary the flux leakage, commutating means connected to the windings of said secondary field structure, and an external reactance in series with said primary.

3. In an electric machine for supplying direct current for arc welding, the combination of an annular primary field structure, a circular secondary field structure within said primary field structure, a shaft for supporting said secondary field structure, means for causing relative angular movement between said field structures, a sectional commutator mounted on said shaft and angularly movable therewith, electrical connections between the sectors of said commutator and the windings of said secondary field structure, a brush system mounted on said shaft for rotation independently thereof, brushes carried by said brush system and engaging said commutator sectors, a motor for rotating said brush structure, means for supplying current to said primary field structure and said motor, and means for varying the phase relation between said rotating brush structure and the rotating magnetic field produced in the primary field structure.

4. Means for producing a direct current having a drooping voltage characteristic in a circuit for arc welding including cooperating welding electrodes, comprising the combination of a primary winding having a core, a secondary winding having a core, said core having the same number of teeth, means for supplying alternating current to said primary winding, commutating means for rectifying the current from the secondary winding and delivering it to the welding electrodes, means for angularly moving said cores relatively to each other to vary the effective air gap between said teeth, and means external of the primary winding for introducing variable inductance in circuit with said windings.

5. Means for producing a direct current having a drooping voltage characteristic in a circuit including cooperating electrodes, comprising the combination of a transformer having primary and secondary windings, means for supplying alternating current to said primary winding, commutating means for rectifying the current from the secondary winding, means for varying the flux leakage in said transformer, and means external of the primary winding for introducing inductance in circuit with said windings.

6. Means for producing a direct current having a drooping voltage characteristic in a circuit including cooperating electrodes, comprising the combination of concentric primary and secondary field structures, means for supplying polyphase alternating current to the windings of the primary field, commutating means including a rotatable portion for supplying direct current to the electrodes from the windings of the secondary field structure, a motor for rotating the rotatable part of said commutating means, means for supplying current to said motor from the source of current that supplies the primary windings, means for causing relative movement between the primary and secondary field structures, said means including a resilient means permitting angular movement under the influence of the magnetic field induced between said field structures, and independent means for changing the phase relation between the rotating part of the commutating means and the induced field in said primary windings.

7. A power unit for supplying current for welding purposes comprising a frame, a primary field structure mounted in said frame, a rotatable shaft, a secondary field structure and a sectional commutator mounted on said shaft and rotatable therewith, a worm mounted on said frame, a resilient coupling, a worm wheel engaging said worm and connected to said shaft through said resilient coupling, a sleeve mounted on said shaft and rotatable with respect thereto, brushes carried by said sleeve and engaging said commutator segments, a motor mounted on said frame having its rotating part connected to said sleeve, and means for causing relative angular movement between the stationary part of said motor and said frame.

8. Means for producing a direct current having a drooping voltage characteristic in a circuit including cooperating electrodes, comprising the combination of a circular primary winding, a cicular secondary winding arranged concentrically with respect to said primary winding, a commutator electrically connected to said secondary winding, rotatable brushes engaging said commutator, a motor having a stator and a rotor connected to said brushes for driving the same, means for supplying alternating current to said primary winding and said motor, a variable inductance in series with the primary windings, means for causing a relative angular motion between said primary and said secondary windings, and means for causing a relative angular motion between said motor stator and said primary winding.

GEORGE T. SOUTHGATE.